United States Patent
You et al.

(10) Patent No.: US 12,052,765 B2
(45) Date of Patent: Jul. 30, 2024

(54) UPLINK TRANSMISSION METHOD AND COMMUNICATION APPARATUS

(71) Applicant: HUAWEI TECHNOLOGIES CO., LTD., Guangdong (CN)

(72) Inventors: Chunhua You, Shanghai (CN); Qufang Huang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 343 days.

(21) Appl. No.: 17/513,882

(22) Filed: Oct. 29, 2021

(65) Prior Publication Data

US 2022/0053570 A1 Feb. 17, 2022

Related U.S. Application Data

(63) Continuation of application No. PCT/CN2020/087484, filed on Apr. 28, 2020.

(30) Foreign Application Priority Data

Apr. 29, 2019 (CN) .......... 201910354518.8

(51) Int. Cl.
*H04W 74/0833* (2024.01)
*H04L 1/1829* (2023.01)
(Continued)

(52) U.S. Cl.
CPC ....... *H04W 74/0833* (2013.01); *H04L 1/1861* (2013.01); *H04W 56/002* (2013.01); *H04W 72/23* (2023.01)

(58) Field of Classification Search
None
See application file for complete search history.

(56) References Cited

U.S. PATENT DOCUMENTS

| 11,405,090 B2* | 8/2022 | Yeo .......... H04W 72/046 |
| 2018/0124724 A1 | 5/2018 | Tsai et al. |
| 2018/0205516 A1 | 7/2018 | Jung et al. |

FOREIGN PATENT DOCUMENTS

| CN | 102123516 A | 7/2011 |
| CN | 102378161 A | 3/2012 |

(Continued)

OTHER PUBLICATIONS

Nokia, Nokia Shanghai Bell, Signaling Aspects for transmission in preconfigured resources. 3GPP TSG RAN WG2 Meeting #104, Spokane, USA, Nov. 12-16, 2018, R2-1817043, 5 pages.

(Continued)

*Primary Examiner* — Minh Trang T Nguyen
(74) *Attorney, Agent, or Firm* — HUAWEI TECHNOLOGIES CO., LTD.

(57) ABSTRACT

This application provides an uplink transmission method and a communication apparatus. When a terminal device does not obtain a TA value in a two-step random access process, the terminal device can transmit, based on a preset TA value or a maintained TA value, uplink data on an uplink transmission resource assigned in the second step of random access, or perform, based on a preset TA value or a maintained TA value, a feedback for downlink data transmitted on a downlink transmission resource assigned in the second step of random access. In this way, uplink synchronization can be implemented when no TA value is assigned in a random access process.

20 Claims, 5 Drawing Sheets

(51) Int. Cl.
 *H04W 56/00* (2009.01)
 *H04W 72/23* (2023.01)

(56) References Cited

FOREIGN PATENT DOCUMENTS

| CN | 108337728 A | 7/2018 |
|---|---|---|
| WO | 2018133645 A1 | 7/2018 |

OTHER PUBLICATIONS

Nokia Corporation et al: "On timing advance commands and synchronization status", 3GPP Draft; R2-082435, Apr. 29, 2008, XP050140123, total 3 pages.

Institute for Information Industry (III), Discussion on transmission in preconfigured UL resources. 3GPP TSG RAN WG1 Meeting #94bis, Chengdu, China, Oct. 8-12, 2018, R1-1811555, 3 pages.

3GPP TS 38.321 V15.5.0 (Mar. 2019), 3rd Generation Partnership Project; Technical Specification Group Radio Access Network; NR; Medium Access Control (MAC) protocol specification(Release 15), 78 pages.

3GPP TS 38.133 V15.5.0 (Mar. 2019), 3rd Generation Partnership Project; Technical Specification Group Radio Access Network; NR; Requirements for support of radio resource management(Release 15), 893 pages.

Institute for Information Industry (III), Discussion on transmission in preconfigured UL resources. 3GPP TSG RAN WG1 Meeting #95, Spokane, USA, Nov. 12-16, 2018, R1-1813529, 4 pages.

Panasonic, Issues on Timing Advance and RACH for NTN. 3GPP TSG RAN WG1 #96bis, Xi an, China, Apr. 8-12, 2019, R1-1904591, 3 pages.

R1-1808440, Nokia et al., Preconfigured Grant for Uplink transmission, 3GPP TSG RAN WG1 Meeting #94, Gothenburg, Sweden, Aug. 20-24, 2018, 4 pages.

* cited by examiner

UPLINK TRANSMISSION METHOD AND COMMUNICATION APPARATUS

CROSS-REFERENCE TO RELATED APPLICATIONS

This application is a continuation of International Application No. PCT/CN2020/087484, filed on Apr. 28, 2020, which claims priority to Chinese Patent Application No. 201910354518.8, filed on Apr. 29, 2019. The disclosures of the aforementioned applications are herein incorporated by reference in their entireties.

TECHNICAL FIELD

This application relates to the communication field, and more specifically, to an uplink transmission method and a communication apparatus.

BACKGROUND

Due to a transmission latency, there is a latency when data sent by a transmitter arrives at a receiver. To reduce inter-symbol interference between different terminal devices, time points at which uplink transmission of a plurality of terminal devices is performed to a network device need to be aligned. Therefore, a timing advance (TA) mechanism is provided. According to the TA mechanism, the terminal device is required to set an uplink timing advance value, so that an uplink slot boundary of data arriving at the network device may be aligned with a downlink slot boundary.

In a conventional technology, the network device may carry a TA command in a random access response message in a four-step random access process, and the terminal device may perform uplink transmission by using a TA value indicated by the TA command. Two-step random access is introduced to reduce a random access latency. In a two-step random access process, the network device may not send a TA command to the terminal device, and how to implement uplink transmission is a problem to be resolved.

SUMMARY

This application provides an uplink transmission method and a communication apparatus. When a terminal device does not obtain a TA value in a random access process, the terminal device can perform uplink transmission based on a preset TA value or a maintained TA value.

According to a first aspect, an uplink transmission method is provided. The method may be performed by a terminal device, or may be performed by a chip configured in a terminal device. An example in which the method is performed by the terminal device is used for description in the following.

The method includes: The terminal device sends a first message to a network device, where the first message is used to initiate random access, in other words, the first message includes a random access signal and information used for contention resolution. The terminal device receives a response message of the first message, where the response message is used to assign an uplink transmission resource or a downlink transmission resource. The terminal device performs uplink transmission by using a first preset timing advance TA value or a maintained TA value, where the uplink transmission includes transmitting uplink data on the uplink transmission resource, or includes a hybrid automatic repeat request (HARQ) feedback for downlink data transmitted on the downlink transmission resource. The response message may include a first response to the random access signal, or include a second response to the information used for contention resolution, or include both the first response and the second response.

It should be understood that the TA value maintained by the terminal device may be a TA value used when uplink transmission is performed last time. Therefore, the network device may know the maintained TA value. The maintained TA value may be or may not be equal to the first preset TA value. This is not limited in this application.

According to the uplink transmission method provided in this application, if the network device does not send a TA value to the terminal device in a random access process, the terminal device may perform uplink transmission by using the first preset TA value, and the network device may determine, based on the first preset TA value, a transmission boundary used during the uplink transmission, thereby implementing uplink synchronization. Alternatively, the terminal device may perform uplink transmission by using the maintained TA value, and the network device may determine, based on the TA value maintained by the terminal device, a transmission boundary used during the uplink transmission, thereby implementing uplink synchronization.

Optionally, the random access signal may include a random access preamble and/or a demodulation reference signal (DMRS). Optionally, the random access signal may be used by the network device to receive the information used for contention resolution.

It should be understood that the information used for contention resolution may also be referred to as data or a payload (payload), and may be user plane data or control plane data.

Optionally, the information used for contention resolution may include an identifier of the terminal device. The identifier of the terminal device may be an identifier assigned by a radio access network (RAN), or may be an identifier assigned by a core network, for example, a cell radio network temporary identifier (C-RNTI), a part of bits of a 5G S-temporary mobile subscriber identity (5G S-TMSI) (the identifier of the terminal device assigned by the core network), or a part of bits (bits) of a system architecture evolution temporary mobile subscriber identity (S-TMSI) (the identifier of the terminal device assigned by the core network).

With reference to the first aspect, in some implementations of the first aspect, that the terminal device performs uplink transmission by using a first preset TA value includes: When a timing advance timer (TAT) is not running, the terminal device performs uplink transmission by using the first preset TA value.

In this solution, the network device can learn whether the TAT of the terminal device is running. If the network device determines that the TAT of the terminal device is not running, the network device may determine that the terminal device is to perform uplink transmission by using the first preset TA value, so that the network device is to determine, based on the first preset TA value, the transmission boundary used during the uplink transmission, such as a start position and/or an end position of a slot (slot), thereby implementing uplink synchronization.

With reference to the first aspect, in some implementations of the first aspect, that the terminal device performs uplink transmission by using a first preset TA value includes: The terminal device performs uplink transmission by using the first preset TA value regardless of whether the TAT is running.

In this solution, regardless of whether the TAT of the terminal device is running, the network device may determine that the terminal device is to perform uplink transmission by using the first preset TA value, so that the network device is to determine, based on the first preset TA value, the transmission boundary used during the uplink transmission, thereby implementing uplink synchronization.

With reference to the first aspect, in some implementations of the first aspect, that the terminal device performs uplink transmission by using a maintained TA value includes: When a TAT is running, the terminal device performs uplink transmission by using the maintained TA value.

In this solution, the network device can learn whether the TAT of the terminal device is running. If the network device determines that the TAT of the terminal device is running, the network device may determine that the terminal device is to perform uplink transmission by using the maintained TA value, so that the network device is to determine, based on the TA value maintained by the terminal device, the transmission boundary used during the uplink transmission, thereby implementing uplink synchronization.

With reference to the first aspect, in some implementations of the first aspect, the method further includes: When receiving the response message, the terminal device starts or restarts the TAT.

In a conventional technology, the terminal device can perform uplink transmission only when the TAT is running. Therefore, the method in this application may be compatible with a conventional technology.

With reference to the first aspect, in some implementations of the first aspect, the method further includes: The terminal device receives, on the downlink transmission resource, a TA command and the downlink data that are sent by the network device, where the TA command is used to indicate an absolute TA value or a relative TA value, the absolute TA value is a TA value used by the terminal device to perform uplink transmission, and the relative TA value and the maintained TA value are used to determine the absolute TA value.

Generally, the absolute TA value is equal to a sum of the relative TA value and the TA value maintained by the terminal device. However, this is not limited in this application.

Further, that the terminal device performs uplink transmission by using a first preset TA value includes: If a result obtained after the terminal device decodes the downlink data is an acknowledgment (ACK), and a time domain resource used for the HARQ feedback is before an effective time point of the TA command, the terminal device performs uplink transmission by using the first preset TA value; or if a result obtained after the terminal device decodes the downlink data is a negative acknowledgment (NACK), the terminal device performs uplink transmission by using the first preset TA value.

With reference to the first aspect, in some implementations of the first aspect, when the timing advance timer TAT is running, the TA command is ignored or discarded.

Based on this solution, the terminal device may not perform uplink transmission based on the TA command.

With reference to the first aspect, in some implementations of the first aspect, when the terminal device receives the TA command, the method further includes: The terminal device starts or restarts the TAT.

With reference to the first aspect, in some implementations of the first aspect, the response message includes downlink control information (DCI), and the DCI is used to indicate the downlink transmission resource.

With reference to the first aspect, in some implementations of the first aspect, cyclic redundancy check (CRC) of the DCI is scrambled by using the identifier of the terminal device. For the identifier of the terminal device, refer to the foregoing description.

With reference to the first aspect, in some implementations of the first aspect, that a terminal device sends a first message to a network device includes: The terminal device sends the first message to the network device by using a second preset TA value.

With reference to the first aspect, in some implementations of the first aspect, the first message further includes:

at least one of first indication information and second indication information, where the first indication information is used to indicate whether the timing advance timer TAT expires in a receiving window of the response message, and the second indication information is used to indicate remaining duration of the TAT.

If the TAT does not expire in the receiving window of the response message, the network device may not send the TA command on the downlink transmission resource.

If the TAT expires in the receiving window of the response message, the network device may send the TA command on the downlink transmission resource.

According to a second aspect, an uplink transmission method is provided. The method may be performed by a network device, or may be performed by a chip configured in a network device. An example in which the method is performed by the network device is used for description in the following.

The method includes: The network device receives a first message sent by a terminal device, where the first message is used to initiate random access, in other words, the first message includes a random access signal and information used for contention resolution. The network device sends a response message of the first message to the terminal device, where the response message is used to assign a downlink transmission resource. The network device sends a timing advance TA command and downlink data on the downlink transmission resource, where the TA command is used to indicate an absolute TA value or a relative TA value, the absolute TA value is a TA value used by the terminal device to perform uplink transmission, and the relative TA value and a TA value maintained by the terminal device are used to determine the absolute TA value, where the uplink transmission includes a hybrid automatic repeat request HARQ feedback for the downlink data. The response message may include a first response to the random access signal, or include a second response to the information used for contention resolution, or include both the first response and the second response.

Based on this solution, if the network device does not send a TA value to the terminal device in a random access process, the network device may send the TA command to the terminal device on the downlink transmission resource assigned in the random access process, and the terminal device may perform uplink transmission based on the TA command, thereby implementing uplink synchronization.

According to a third aspect, an uplink transmission method is provided. The method may be performed by a terminal device, or may be performed by a chip configured in a terminal device. An example in which the method is performed by the terminal device is used for description in the following.

The method includes: The terminal device sends a first message to a network device, where the first message is used to initiate random access, in other words, the first message includes a random access signal and information used for contention resolution. The terminal device receives a response message of the first message, where the response message includes downlink control information DCI, the DCI is used to indicate a downlink transmission resource, and CRC of the DCI is scrambled by using an identifier of the terminal device. The terminal device receives a timing advance TA command on the downlink transmission resource. The terminal device performs uplink transmission by using a TA value indicated by the TA command. The response message may include a first response to the random access signal, or include a second response to the information used for contention resolution, or include both the first response and the second response.

Based on this solution, if the network device does not send a TA value to the terminal device in a random access process, the network device may send the TA command to the terminal device on the downlink transmission resource assigned in the random access process, and the terminal device may perform uplink transmission based on the TA command, thereby implementing uplink synchronization.

With reference to the third aspect, in some implementations of the third aspect, that the terminal device performs uplink transmission by using a TA value indicated by the TA command includes: If a result obtained after the terminal device decodes downlink data is an acknowledgment ACK, and a time domain resource used for a HARQ feedback is after an effective time point of the TA command, the terminal device performs uplink transmission by using the TA value indicated by the TA command; or if a result obtained after the terminal device decodes downlink data is a negative acknowledgment NACK, the terminal device performs uplink transmission by using the TA value indicated by the TA command.

With reference to the third aspect, in some implementations of the third aspect, when the terminal device receives the TA command, the method further includes: The terminal device starts or restarts a timing advance timer TAT.

In a conventional technology, the terminal device can perform uplink transmission only when the TAT is running. Therefore, the method in this application may be compatible with a conventional technology.

According to a fourth aspect, this application provides a communication apparatus. The communication apparatus has a function of implementing behavior of the terminal device in any aspect of the foregoing methods, and includes units or means (means) corresponding to steps or functions described in the method in the first aspect or the third aspect. The steps or functions may be implemented by using software, hardware, or a combination of hardware and software.

According to a fifth aspect, this application provides a communication apparatus. The communication apparatus has a function of implementing behavior of the network device in any aspect of the foregoing methods, and includes units or means (means) corresponding to steps or functions described in the method in the second aspect. The steps or functions may be implemented by using software, hardware, or a combination of hardware and software.

According to a sixth aspect, this application provides a communication apparatus, including a processor. The processor is configured to be connected to a memory, and read and execute a program stored in the memory, to implement the method provided in the first aspect or the third aspect.

Optionally, there are one or more processors and one or more memories.

Optionally, the memory may be integrated into the processor, or the memory and the processor are separately disposed.

In an implementation process, the memory may be a non-transitory (non-transitory) memory, such as a read-only memory (ROM). The memory and the processor may be integrated into one chip, or may be disposed in different chips. A type of the memory and a manner in which the memory and the processor are disposed are not limited in this embodiment of this application.

It should be understood that a related data exchange process, for example, sending the first message, may be a process of outputting the first message from the processor, and receiving the response message may be a process of receiving the response message by the processor. Data output by the processor may be output to a transmitter, and input data received by the processor may be from a receiver. The transmitter and the receiver may be collectively referred to as a transceiver.

The apparatus in the sixth aspect may be a chip. The processor may be implemented by using hardware or software. When the processor is implemented by using hardware, the processor may be a logic circuit, an integrated circuit, or the like. When the processor is implemented by using software. The processor may be a general purpose processor, and is implemented by reading software code stored in the memory. The memory may be integrated into the processor, or may exist independently outside the processor.

According to a seventh aspect, this application provides a communication apparatus, including a processor. The processor is configured to be connected to a memory, and read and execute a program stored in the memory, to implement the method provided in the second aspect.

Optionally, there are one or more processors and one or more memories.

Optionally, the memory may be integrated into the processor, or the memory and the processor are separately disposed.

In one implementation process, the memory may be a non-transitory (non-transitory) memory, such as a read-only memory (ROM). The memory and the processor may be integrated on a same chip, or may be separately disposed on different chips. A type of the memory and a manner in which the memory and the processor are disposed are not limited in the embodiments of this application.

It should be understood that a related data exchange process, for example, sending the response message, may be a process of outputting the response message from the processor, and receiving the first message may be a process of receiving the first message by the processor. Data output by the processor may be output to a transmitter, and input data received by the processor may be from a receiver. The transmitter and the receiver may be collectively referred to as a transceiver.

The apparatus in the seventh aspect may be a chip. The processor may be implemented by using hardware or software. When the processor is implemented by using hardware, the processor may be a logic circuit, an integrated circuit, or the like. When the processor is implemented by using software. The processor may be a general purpose processor, and is implemented by reading software code stored in the memory. The memory may be integrated into the processor, or may exist independently outside the processor.

According to an eighth aspect, this application provides a communication apparatus, including a processor and an interface circuit. The processor is configured to communicate with another apparatus through the interface circuit, and perform the method provided in the first aspect or the third aspect.

Optionally, there are one or more processors and one or more memories.

According to a ninth aspect, this application provides a communication apparatus, including a processor and an interface circuit. The processor is configured to communicate with another apparatus through the interface circuit, and perform the method provided in the second aspect.

Optionally, there are one or more processors and one or more memories.

According to a tenth aspect, this application provides a program. When being executed by a processor, the program is used to perform the methods provided in the first aspect to the third aspect.

According to an eleventh aspect, this application provides a program product, for example, a computer-readable storage medium, including the program in the tenth aspect.

Based on the foregoing technical solutions, if the network device does not send a TA value to the terminal device in the random access process, the terminal device may perform uplink transmission by using the first preset TA value, and the network device may determine, based on the first preset TA value, the transmission boundary used during the uplink transmission, thereby implementing uplink synchronization. Alternatively, the terminal device may perform uplink transmission by using the maintained TA value, and the network device may determine, based on the TA value maintained by the terminal device, the transmission boundary used during the uplink transmission, thereby implementing uplink synchronization. Alternatively, the network device may send the TA command to the terminal device on the downlink transmission resource assigned in the random access process, and the terminal device may perform uplink transmission based on the TA command, thereby implementing uplink synchronization.

DESCRIPTION OF EMBODIMENTS

The following describes technical solutions of this application with reference to the accompanying drawings.

Figure 1:
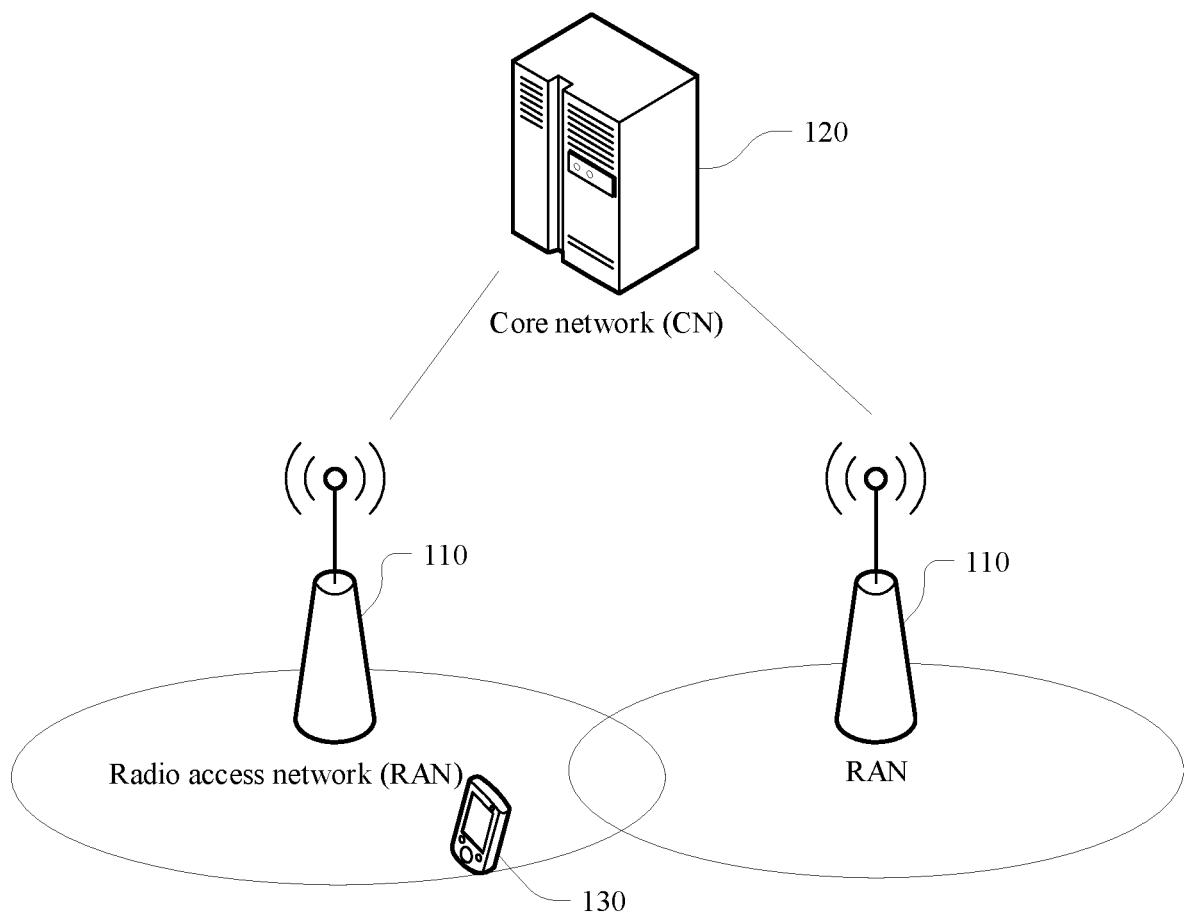
FIG. 1 is a schematic diagram of a communication system according to an embodiment of this application.

FIG. 1 is a schematic diagram of a communication system according to an embodiment of this application. As shown in FIG. 1, a terminal device 130 accesses an access network (RAN) 110 and a core network (CN) 120. The RAN 110 is configured to connect the terminal device 130 to a wireless network, and the CN 120 is configured to manage the terminal device 130 and provide a gateway for communicating with an external network.

A terminal device is also referred to as user equipment (UE), a mobile station (MS), a mobile terminal (MT), or the like, and is a device that provides voice/data connectivity for a user, for example, a handheld device or a vehicle-mounted device with a wireless connection function. Currently, some examples of the terminal device are a mobile phone (mobile phone), a tablet computer, a laptop computer, a palmtop computer, a mobile Internet device (MID), a wearable device, a virtual reality (VR) device, an augmented reality (AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

A network device is a device in a wireless network, for example, a RAN node that enables a terminal device to access the wireless network. Currently, some examples of the RAN node are a gNB, a transmission reception point (TRP), an evolved NodeB (eNB), a radio network controller (RNC), a NodeB (NB), a base station controller (BSC), a base transceiver station (BTS), a home base station (HNB), a baseband unit (BBU), a wireless fidelity (Wi-Fi) access point (AP), and the like. In a network structure, the network device may include a centralized unit (CU) node, a distributed unit (DU) node, or a RAN device including a CU node and a DU node.

Figure 2:
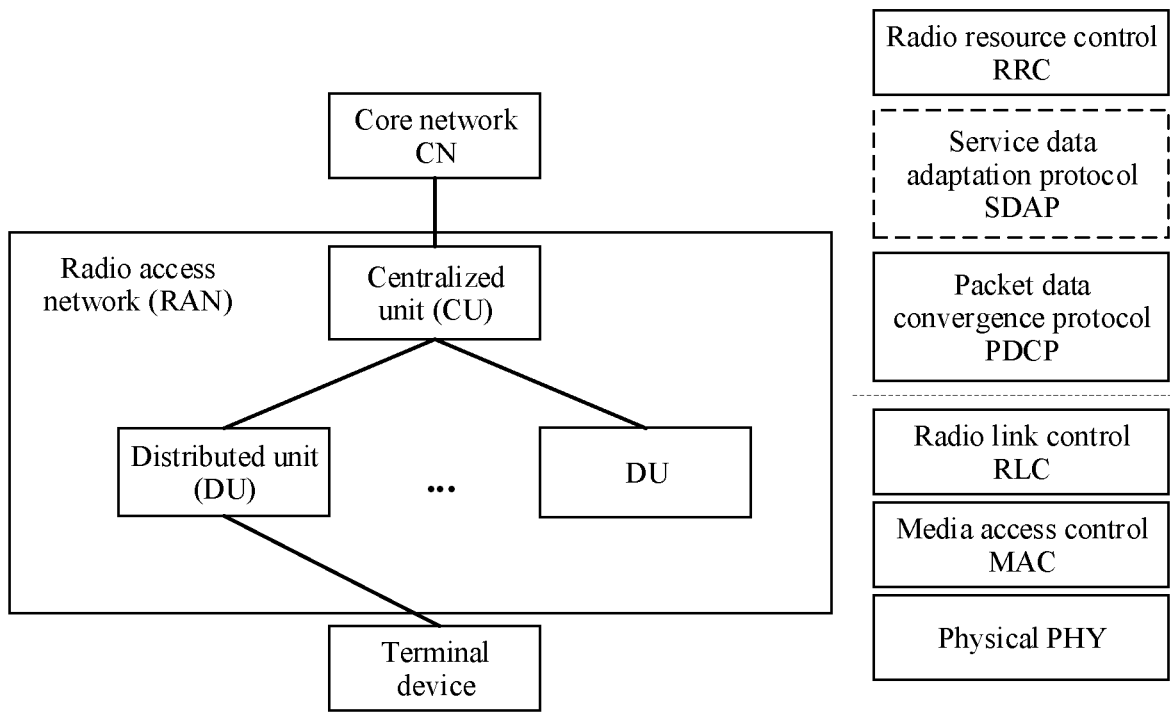
FIG. 2 is a schematic diagram of a network architecture according to an embodiment of this application.

FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in a long term evolution (LTE) communication system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU.

Communication between the RAN device and a terminal device complies with a specified protocol layer structure. For example, a control plane protocol layer structure may include functions of protocol layers, such as a radio resource control (RRC) layer, a packet data convergence protocol (PDCP) layer, a radio link control (RLC) layer, a media access control (MAC) layer, and a physical layer, for example. A user plane protocol layer structure may include functions of protocol layers such as a PDCP layer, an RLC layer, a MAC layer, and a physical layer. In an implementation, a service data adaptation protocol (SDAP) layer may further be included above the PDCP layer.

The functions of these protocol layers may be implemented by one node, or may be implemented by a plurality of nodes. For example, in an evolved structure, the RAN device may include a centralized unit (CU) and a distributed unit (DU). A plurality of DUs may be centrally controlled by one CU. As shown in FIG. 2, the CU and the DU may be divided based on protocol layers of a wireless network. For example, functions of the PDCP layer and a protocol layer above the PDCP layer are set on the CU, and functions of protocol layers below the PDCP layer, such as the RLC layer and the MAC layer, are set on the DU.

Division into the protocol layers is merely an example, and division may alternatively be performed at another protocol layer, for example, the RLC layer. Functions of the RLC layer and a protocol layer above the RLC layer are set on the CU, and a function of a protocol layer below the RLC layer are set on the DU. Alternatively, division is performed in a protocol layer, for example, a part of functions of the RLC layer and a function of a protocol layer above the RLC layer are set on the CU, and a remaining function of the RLC layer and a function of a protocol layer below the RLC layer are set on the DU. In addition, division may alternatively be performed in another manner. For example, division is performed based on a latency. A function whose processing time needs to satisfy a latency requirement is set on the DU, and a function whose processing time does not need to satisfy the latency requirement is set on the CU.

In addition, the radio frequency apparatus may be not placed in the DU but is placed remotely from the DU, or may be integrated into the DU, or a part is placed remotely from the DU and a remaining part is integrated into the DU. This is not limited herein.

Figure 3:
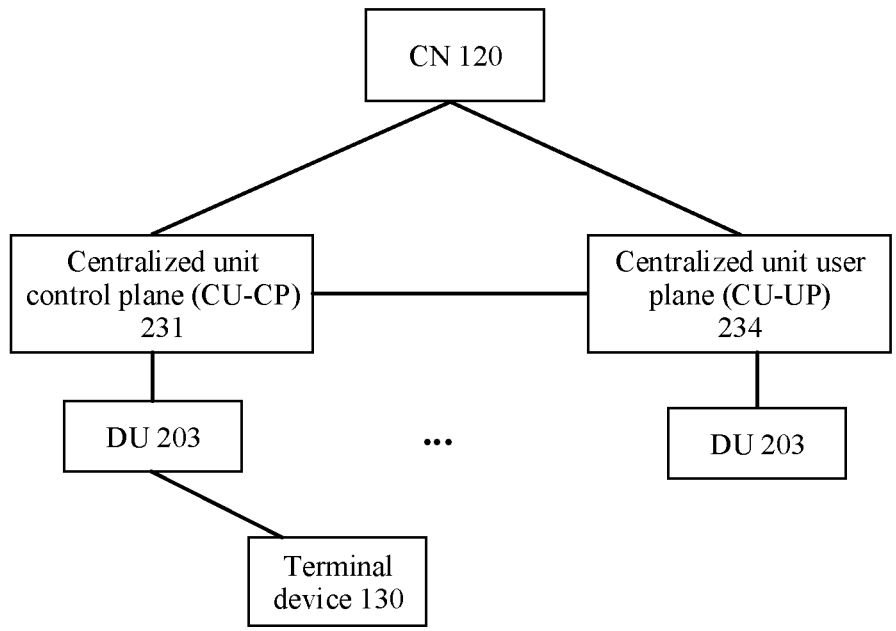
FIG. 3 is a schematic diagram of another network architecture according to an embodiment of this application.

Referring to FIG. 3, compared with the architecture shown in FIG. 2, a control plane (CP) and a user plane (UP) of a CU may further be separated into different entities for implementation, and the different entities are a control plane CU entity (CU-CP entity) and a user plane CU entity (CU-UP entity).

In the foregoing network architecture, signaling generated by the CU may be sent to a terminal device by using the DU, or signaling generated by the terminal device may be sent to the CU by using the DU. The DU may transparently transmit the signaling to the terminal device or the CU by directly encapsulating the signaling at a protocol layer without parsing the signaling. In the following embodiments, if such transmission of signaling between the DU and the terminal device is involved, that the DU sends or receives the signaling includes this scenario. For example, signaling at an RRC layer or a PDCP layer is finally processed as signaling at a PHY layer and sent to the terminal device, or is converted from received signaling at the PHY layer. In the architecture, the signaling at the RRC layer or the PDCP layer may further be considered to be sent by the DU, or sent by the DU and a radio frequency apparatus.

In the foregoing embodiments, the CU is classified as a network device on a RAN side. In addition, the CU may alternatively be classified as a network device on a CN side. This is not limited herein.

An apparatus in the following embodiments of this application may be located in a terminal device or a network device based on functions implemented by the apparatus. When the foregoing CU-DU structure is used, the network device may be a CU node, a DU node, or a RAN device including a CU node and a DU node.

The terminal device may implement uplink synchronization with the network device in a four-step random access process. In the first step, the terminal device sends a message 1 (message 1, msg 1 for short) to the network device. The message 1 is a random access preamble (preamble). In the second step, after detecting the random access preamble, the network device returns a response message, namely, a message 2 (message 2), to the terminal device. The message 2 includes an uplink resource assigned by a network side to the terminal device and a TA command (command). In the third step, after receiving the message 2, the terminal device sends a message 3 on the uplink resource indicated by the message 2 by using a TA value indicated by the TA command. In the fourth step, if the network device can correctly decode the message 3 (message 3), the network device returns a message 4 (message 4) to the terminal device, where the message 4 is used to notify the terminal device that contention succeeds. After the foregoing four steps, the random access process succeeds.

With introduction of new wireless terminal types such as machine type communication (MTC) and narrowband Internet of Things (NB-IoT), the quantity of terminal devices has increased exponentially. If all terminal devices perform random access by using a four-step random access type, a payload of the network device is excessively high. In addition, a latency of the four-step random access is relatively long.

To solve these problems, a two-step random access is introduced. In a two-step random access process, the network device may not send a TA command to the terminal device, and how to implement uplink synchronization is a problem to be resolved.

Therefore, this application provides an uplink transmission method. In the method, the terminal device may perform uplink transmission based on a preset TA value or a TA value maintained by the terminal device, to implement uplink synchronization. Description is provided below, with reference to FIG. 2.

It should be understood that when the method in this application is described in this specification, an example in which the method is performed by the terminal device or the network device is used for description. Actually, an operation performed by the terminal device may alternatively be performed by a chip configured in the terminal device, and an operation performed by the network device may alternatively be performed by a chip configured in the network device.

Figure 4:
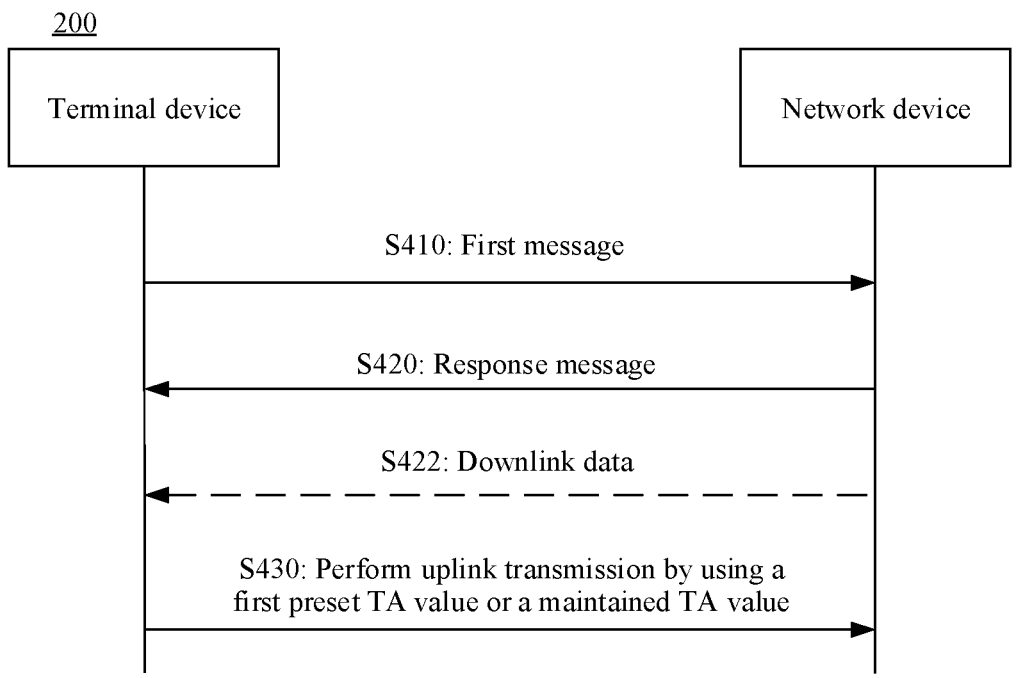
FIG. 4 is a flowchart of an uplink transmission method according to an embodiment of this application.

FIG. 4 is a flowchart of an uplink transmission method 200 according to this application. The method 200 mainly includes S210 to S230. The following describes the steps.

S210: A terminal device sends a first message to a network device. Correspondingly, the network device receives the first message sent by the terminal device.

S210 is the first step of a two-step random access process, and the first message sent in the first step includes a random access signal and information used for contention resolution.

Optionally, the random access signal may include a random access preamble and/or a demodulation reference signal (DMRS).

Optionally, the random access signal may be used by the network device to receive the information used for contention resolution. In some embodiments, the network device may determine, based on the random access signal, a transmission boundary at which the terminal device transmits the information for contention resolution, including a position at which the terminal device transmits the information used for contention resolution, such as a start position and/or an end position of a slot, for example. Alternatively, the random access signal may be used to assist the network device in demodulating the information used for contention resolution.

The information used for contention resolution may also be referred to as data or a payload (payload), and may be user plane data or control plane data. The information used for contention resolution may include one or more of the following information: an identifier of the terminal device, a random number, or a cause value of random access. The identifier of the terminal device may be an identifier assigned by a RAN. Alternatively, the identifier may be assigned by a core network, for example, a cell radio network temporary identifier (C-RNTI), a portion of bits of a 5G S-temporary mobile subscriber identity (5G S-TMSI) (the identifier of the terminal device assigned by the core network), or a portion of bits of a system architecture evolution temporary mobile subscriber identity (S-TMSI) (the identifier of the terminal device assigned by the core network). The identifier of the terminal device may be carried in the information used for contention resolution, or may be partially carried in the information used for contention resolution and partially carried in the random access signal. The cause value may include information about a type or a cause of the random access, and may be a RRC message.

Optionally, the first message may be sent by using a second preset TA value. The second preset TA value may be or may not be equal to a first preset TA value in the following.

S220: The network device sends a response message of the first message to the terminal device. Correspondingly, the terminal device receives the response message sent by the network device.

The response message may include a first response to the random access signal, or include a second response to the information used for contention resolution, or include both the first response and the second response.

For example, the first response may include an identifier of the random access signal. For example, when the random access signal is a preamble, the first response may include a random access preamble identifier (RAPID). The second response may include contention resolution information. For example, the contention resolution information is obtained based on the information used for contention resolution. The contention resolution information may be a portion of or all of the information used for contention resolution. The contention resolution information indicates that a random access succeeds or a contention resolution succeeds. In addition, other information in the response message may be carried in the first response, or may be carried in the second response, or may be independent of the first response and the second response. For example, the first response may further include information used to assign an uplink transmission resource or a downlink transmission resource. For another example, a TA command may be carried in the first response.

S220 is the second step of the two-step random access process. After receiving the random access signal and the information used for contention resolution sent by the terminal device, the network device decodes the random access signal and the information used for contention resolution and sends the response message to the terminal device based on a decoding result. The response message is used to indicate a random access status of the terminal device, that is, whether the random access succeeds.

In addition to indicating the random access status of the terminal device, the response message may further be used to assign the uplink transmission resource or the downlink transmission resource. Alternatively, the response message includes uplink grant information or downlink assignment information. The uplink grant information is used to assign the uplink transmission resource, and the downlink assignment information is used to assign the downlink transmission resource.

Optionally, the response message includes downlink control information DCI, and the DCI is used to indicate (which is alternatively referred to as "assign") the downlink transmission resource. Alternatively, the response message includes DCI, and the DCI is the downlink assignment information. In another alternative, the response message includes DCI, and the DCI includes the downlink assignment information.

Optionally, the response message includes DCI, and the DCI is used to indicate the uplink transmission resource. Alternatively, the response message includes DCI, and the DCI is the uplink grant information. In another alternative, the response message includes DCI, and the DCI includes the uplink grant information.

Further, the CRC of the DCI is scrambled by using the identifier of the terminal device. For a specific value of the identifier of the terminal device, refer to the foregoing description. Details are not described herein again.

Optionally, when receiving the response message, the terminal device may further start a TAT.

When the terminal device receives the response message, if the TAT is not running, the terminal device may start the TAT.

Optionally, when the terminal device receives the response message, if the TAT is running, the terminal device may restart the TAT. In this way, a running duration of the TAT may be extended, and uplink transmission may further be performed in subsequent scheduling.

In a conventional technology, the terminal device can perform uplink transmission only when the TAT is running. Therefore, the method in this application may be compatible with the conventional technology.

It should be noted that, in this application, when the TAT is not started, or when the TAT is not running, the terminal device may also perform uplink transmission.

S230: The terminal device performs uplink transmission by using the first preset TA value or a maintained TA value.

If the uplink transmission resource is assigned in the response message, the uplink transmission includes transmitting uplink data on the uplink transmission resource.

After receiving the response message, the terminal device may determine the uplink transmission resource assigned by using the response message, and then the terminal device may transmit the uplink data on the uplink transmission resource by using the first preset TA value or the maintained TA value.

Alternatively, if the downlink transmission resource is assigned in the response message, the uplink transmission includes performing a HARQ feedback for downlink data transmitted on the downlink transmission resource.

It may be understood that, in this case, before S230, the method may further include the following step.

S222: The network device sends the downlink data on the downlink transmission resource. Correspondingly, the terminal device receives the downlink data on the downlink transmission resource.

After receiving the response message, the terminal device may determine the downlink transmission resource assigned by using the response message, and then the terminal device monitors a channel by using the downlink transmission resource, receives the downlink data sent by the network device, and performs, by using the first preset TA value and the maintained TA value, the HARQ feedback based on a result obtained after the terminal device decodes the downlink data. When the terminal device successfully decodes the downlink data, the terminal device sends a HARQ acknowledgment (ACK) to the network device. When the terminal device fails to decode the downlink data, the terminal device sends a HARQ negative acknowledgment (NACK) to the network device.

Optionally, a resource used for the HARQ feedback may be determined based on a position of the DCI in the response message in time domain.

Optionally, the resource used for the HARQ feedback may be explicitly indicated by using the DCI in the response message. For example, the DCI may include time domain position information and frequency domain position information of the resource used for the HARQ feedback.

In S230, the terminal device may perform uplink transmission by using the first preset TA value, or may perform uplink transmission by using the maintained TA value.

The TA value maintained by the terminal device may be a TA value used when uplink transmission is performed a previous time. Therefore, the network device may know the maintained TA value. The maintained TA value may be or may not be equal to the first preset TA value. This is not limited in this application.

In an embodiment, the terminal device performing uplink transmission by using the first preset TA value includes: when the TAT is not running, the terminal device performs uplink transmission by using the first preset TA value. In other words, the terminal device performs uplink transmission by using the first preset TA value only when the TAT is not running.

In this solution, the network device can learn whether the TAT of the terminal device is running. If the network device determines that the TAT of the terminal device is not running, the network device may determine that the terminal device is to perform uplink transmission by using the first preset TA value, so that the network device is to determine, based on the first preset TA value, a transmission boundary used during the uplink transmission, such as a start position and/or an end position of a slot (slot), thereby implementing uplink synchronization.

In an embodiment, the terminal device performing uplink transmission by using the first preset TA value includes: the terminal device performs uplink transmission by using the first preset TA value regardless of whether the TAT is running.

In this solution, regardless of whether the TAT of the terminal device is running, the network device may determine that the terminal device is to perform uplink transmission by using the first preset TA value, so that the network device is to determine, based on the first preset TA value, the transmission boundary used during the uplink transmission, thereby implementing uplink synchronization.

In an embodiment, the terminal device performing uplink transmission by using a maintained TA value includes: when the TAT is running, the terminal device performs uplink transmission by using the maintained TA value.

In this solution, the network device can learn whether the TAT of the terminal device is running. If the network device determines that the TAT of the terminal device is running, the network device may determine that the terminal device is to perform uplink transmission by using the maintained TA value, so that the network device is to determine, based on the TA value maintained by the terminal device, the transmission boundary used during the uplink transmission, thereby implementing uplink synchronization.

In conclusion, according to the uplink transmission method provided in this application, if the network device does not send a TA value to the terminal device in a random access process, the terminal device may perform uplink transmission by using the first preset TA value, and the network device may determine, based on the first preset TA value, the transmission boundary used during the uplink transmission, thereby implementing uplink synchronization. Alternatively, the terminal device may perform uplink transmission by using the maintained TA value, and the network device may determine, based on the TA value maintained by the terminal device, the transmission boundary used during the uplink transmission, thereby implementing uplink synchronization.

Optionally, in S222, in addition to sending the downlink data on the downlink transmission resource, the network device may further send the TA command on the downlink transmission resource. Correspondingly, the terminal device receives the TA command on the downlink transmission resource.

The TA command is used to indicate an absolute TA value or a relative TA value. The absolute TA value is a TA value used by the terminal device to perform uplink transmission, and the relative TA value and the TA value maintained by the terminal device are used to determine the absolute TA value.

It should be understood that the absolute TA value is a TA value finally used when the terminal device performs uplink transmission. The relative TA value and the TA value maintained by the terminal device are used to determine the absolute TA value. Generally, the absolute TA value is equal to a sum of the relative TA value and the TA value maintained by the terminal device. However, this is not limited in this application.

Further, if the result obtained after the terminal device decodes the downlink data sent on the downlink transmission resource is the ACK, and a time domain resource used for the HARQ feedback is before an effective time point of the TA command, the terminal device may perform uplink transmission using the first preset TA value. If the result obtained after the terminal device decodes the downlink data sent on the downlink transmission resource is the NACK, the terminal device may perform uplink transmission by using the first preset TA value.

When correctly decoding the downlink data sent on the downlink transmission resource, the terminal device may not decode the TA command. Because the terminal device needs to spend time to process the TA command, when the time domain resource for transmitting the result obtained after the terminal device decodes the downlink data arrives, if the terminal device does not decode the TA command, the TA command cannot take effect. In this case, the terminal device may feed back, to the network device by using the first preset TA value, the result obtained after the terminal device decodes the downlink data, namely, the ACK. For example, referring to FIG. 5, the terminal device receives the TA command at a moment T1 and the time that the terminal device needs to spend to process the TA command is Δ. In other words, the TA command takes effect at a moment T1+Δ at earliest. A start moment of the time domain resource used for the HARQ feedback is T2, and the moment T2 is earlier than the moment T1+Δ. In other words, the terminal device needs to perform the HARQ feedback at the moment T2, but the TA command takes effect at the moment T1+Δ at earliest. Therefore, the terminal device cannot perform the HARQ feedback based on the TA command, but can perform the HARQ feedback by using the first preset TA value.

On the other hand, the terminal device may not receive the downlink data sent on the downlink transmission resource and the TA command. Therefore, the result obtained after the terminal device decodes the downlink data is the NACK. In this case, the terminal device may feed back, to the network device by using the first preset TA value, the result obtained after the terminal device decodes the downlink data, namely, the NACK.

Alternatively, if the result obtained after the terminal device decodes the downlink data sent on the downlink transmission resource is the ACK, and a time domain resource used for the HARQ feedback is after an effective time point of the TA command, the terminal device may feed back, to the network device (using the absolute TA value indicated by the TA command or the absolute TA value determined based on the relative TA value indicated by the TA command), the result obtained after the terminal device decodes the downlink data, namely, the ACK.

Optionally, when receiving the TA command, the terminal device may ignore, discard, or skip using the TA command. For example, if the TAT is running, the terminal device may ignore, discard, or skip using the TA command. Further, the terminal device may perform uplink transmission by using the TA value maintained by the terminal device.

Optionally, the first message may include at least one of first indication information and second indication information. The first message may include only one of the first indication information and the second indication information, or may include both the first indication information and the second indication information. The first indication information indicates whether the TAT expires in a following receiving window (which is denoted as a window A) of the response message. The second indication information indicates remaining duration of the TAT. The network device may determine, based on the remaining duration of the TAT, whether the TAT expires in the window A.

During the window A, the terminal device expects to receive the response message. If the terminal device has not received the response message when the window A ends, the terminal device may retransmit the first message. Duration of the window A may be configured by the network device, or may be stipulated in a protocol. A start moment of the window A may be a delay period (i.e., x ms), after the terminal device sends the random access signal and/or the information used for contention resolution, where x is greater than or equal to zero.

If the TAT does not expire in the window A, the network device may not send the TA command on the downlink transmission resource.

If the TAT expires in the window A, the network device may send the TA command on the downlink transmission resource.

In this application, in an alternative solution of S230, the terminal device may perform uplink transmission by using the TA command.

In other words, the terminal device performs uplink transmission by using the TA command, instead of performing uplink transmission by using the first preset TA value or the TA value maintained by the terminal device. In this manner, the uplink transmission may be performing the HARQ feedback for the downlink data transmitted on the downlink transmission resource assigned in the response message, or may be performing a HARQ feedback for downlink data transmitted on another downlink transmission resource.

For example, if the result obtained after the terminal device decodes the downlink data is the ACK, and the time domain resource used for the HARQ feedback is after the effective time point of the TA command, the terminal device may feed back to the network device, using the absolute TA value indicated by the TA command or the absolute TA value determined based on the relative TA value indicated by the TA command, the result obtained after the terminal device decodes the downlink data, namely, the ACK.

For another example, if the result obtained after the terminal device decodes the downlink data is the NACK, the terminal device may feed back, to the network device by using the absolute TA value indicated by the TA command or the absolute TA value determined based on the relative TA value indicated by the TA command, the result obtained after the terminal device decodes the downlink data, namely, the NACK.

Based on this solution, if the network device does not send a TA value to the terminal device in the random access process, the network device may send the TA command to the terminal device on the downlink transmission resource assigned in the random access process, and the terminal device may perform uplink transmission based on the TA command, thereby implementing uplink synchronization.

Optionally, in this application, the terminal device may further start or restart the TAT when receiving the TA command.

If the TAT is not running, the terminal device may start the TAT when receiving the TA command. In this case, a TA value corresponding to the TAT may be the absolute TA value indicated by the TA command or the absolute TA value determined based on the relative TA value indicated by the TA command. If the TAT is running, the terminal device may restart the TAT when receiving the TA command.

Based on this solution, the network device may send the TA command on the downlink transmission resource, and the terminal device may perform uplink transmission based on the TA command with reference to a running state of the TAT.

Figure 5:
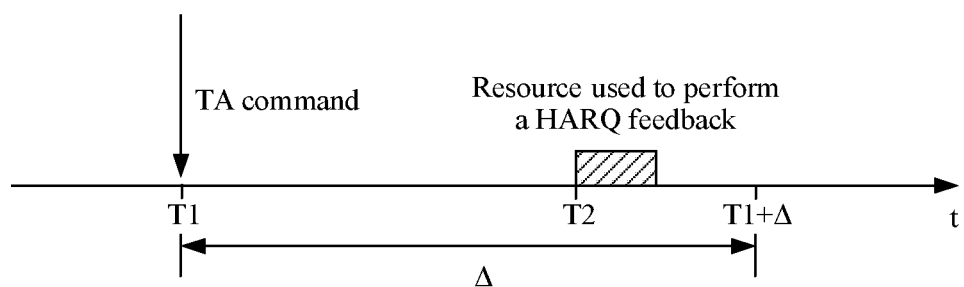
FIG. 5 is a schematic diagram of an effective time point of a TA command according to an embodiment of this application.

The foregoing describes in detail the transmission methods in the embodiments of this application with reference to FIG. 4 and FIG. 5. The following describes in detail apparatuses in the embodiments of this application with reference to FIG. 6 to FIG. 8.

Figure 6:
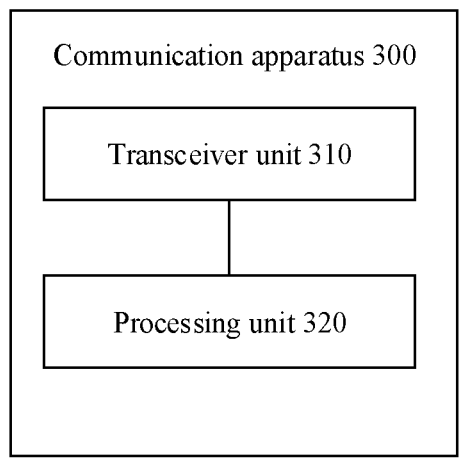
FIG. 6 is a schematic block diagram of a communication apparatus according to an embodiment of this application.

FIG. 6 is a schematic block diagram of a communication apparatus 300 according to an embodiment of this application. As shown in FIG. 6, the apparatus 300 may include a transceiver unit 310. Optionally, the apparatus 300 may further include a processing unit 320 coupled to the transceiver unit 310.

In a design embodiment, the apparatus 300 may be the terminal device in the foregoing method 200. For example, the apparatus 300 may be a terminal device, or a chip configured in a terminal device.

In some embodiments, the transceiver unit 310 is configured to send a first message to a network device, where the first message is used to initiate random access; receive a response message of the first message, where the response message is used to assign an uplink transmission resource or a downlink transmission resource; and perform uplink transmission by using a first preset timing advance TA value or a maintained TA value. The uplink transmission includes transmitting uplink data on the uplink transmission resource, or includes a hybrid automatic repeat request HARQ feedback for downlink data transmitted on the downlink transmission resource.

In some embodiments, the transceiver unit 310 is configured to, when a timing advance timer TAT is not running, perform uplink transmission by using the first preset TA value.

In some embodiments, the transceiver unit 310 is, configured to, when a timing advance timer TAT is running, perform uplink transmission by using the maintained TA value.

In some embodiments, the processing unit 320 is configured to, when the transceiver unit 310 receives the response message, start or restart the timing advance timer TAT.

In some embodiments, the transceiver unit 310 is further configured to receive, on the downlink transmission resource, a TA command and the downlink data that are sent by the network device, where the TA command is used to indicate an absolute TA value or a relative TA value, the absolute TA value is a TA value used by the communication apparatus to perform uplink transmission, and the relative TA value and the maintained TA value are used to determine the absolute TA value.

In some embodiments, the transceiver unit 310 is configured to, if a result obtained after the downlink data is decoded is an acknowledgment ACK and a time domain resource used for the HARQ feedback is before an effective time point of the TA command, perform uplink transmission by using the first preset TA value. If a result obtained after the downlink data is decoded is a negative acknowledgment NACK, perform uplink transmission using the first preset TA value.

In some embodiments, when the timing advance timer TAT is running, the TA command is ignored or discarded.

In some embodiments, when the transceiver unit 310 receives the TA command, the processing unit 320 is configured to start or restart the timing advance timer TAT.

In some embodiments, the response message includes downlink control information DCI, and the downlink control information is used to indicate the downlink transmission resource.

In some embodiments, a cyclic redundancy check (CRC) of the DCI is scrambled using an identifier of the communication apparatus.

In some embodiments, the transceiver unit 310 is configured to send the first message to the network device using a second preset TA value.

In some embodiments, the first message further includes at least one of first indication information and second indication information, where the first indication information indicates whether the timing advance timer TAT expires in a receiving window of the response message, and the second indication information is used to indicate remaining duration of the TAT.

It should be understood that the apparatus 300 may correspond to the terminal device in the method 200 according to the embodiments of this application. The apparatus 300 may include units configured to perform the method performed by the terminal device in the method 200. In addition, the units in the apparatus 300 and the foregoing other operations and/or functions are separately used to implement corresponding procedures in the method 200. For a process in which the units perform the foregoing corresponding steps, refer to the description in the foregoing method embodiments with reference to FIG. 4 and FIG. 5. For brevity, details are not described herein again.

It should further be understood that when the apparatus 300 is the chip disposed in the terminal device, the transceiver unit 310 in the apparatus 300 may be an input/output interface.

In another design embodiment, the apparatus 300 may be the network device in the foregoing method 200. For example, the apparatus 300 may be a network device, or a chip configured in a network device.

In some embodiments, the transceiver unit 310 is configured to receive a first message sent by a terminal device, where the first message is used to initiate random access; send a response message of the first message to the terminal device, where the response message is used to assign a downlink transmission resource; and send a timing advance TA command and downlink data on the downlink transmission resource, where the TA command is used to indicate an absolute TA value or a relative TA value, the absolute TA value is a TA value used by the terminal device to perform uplink transmission, and the relative TA value and a TA value maintained by the terminal device are used to determine the absolute TA value, where the uplink transmission includes a hybrid automatic repeat request (HARQ) feedback for the downlink data.

It should be understood that the apparatus 300 may correspond to the network device in the method 200 according to the embodiments of this application. The apparatus 300 may include units configured to perform the method performed by the network device in the method 200. In addition, the units in the apparatus 300 and the foregoing other operations and/or functions are separately used to implement corresponding procedures in the method 200. For a process in which the units perform the foregoing corresponding steps, refer to the description in the foregoing method embodiments with reference to FIG. 4 and FIG. 5. For brevity, details are not described herein again.

It should further be understood that when the apparatus 300 is a chip disposed in a network device, the transceiver unit 310 in the apparatus 300 may be an input/output interface.

It should be understood that division into units in the foregoing apparatuses is merely logical function division. During actual implementation, all or some of the units may be integrated into one physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. Alternatively, each unit may be stored in a memory in a form of a program to be invoked by a processing element of the apparatus to perform a function of the unit. In addition, some or all of the units may be integrated together, or the units may be implemented independently. The processing element herein may also be referred to as a processor, and may be an integrated circuit having a signal processing capability. In an implementation process, the steps in the foregoing methods or the foregoing units may be implemented by using a hardware integrated logic circuit in the processing element, or may be implemented in a form of software invoked by the processing element.

In an example, a unit in any one of the foregoing apparatuses may be one or more integrated circuits configured to implement the foregoing methods, for example, one or more application-specific integrated circuits (ASICs), one or more microprocessors (DSPs), one or more field programmable gate arrays (FPGAs), or a combination of at least two of these integrated circuit forms. For another example, when the unit in the apparatus may be implemented by a program invoked by the processing element, the processing element may be a general purpose processor, for example, a central processing unit (CPU), or another processor that can invoke the program. For another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit of the chip, configured to send a signal to another chip or apparatus.

Figure 7:
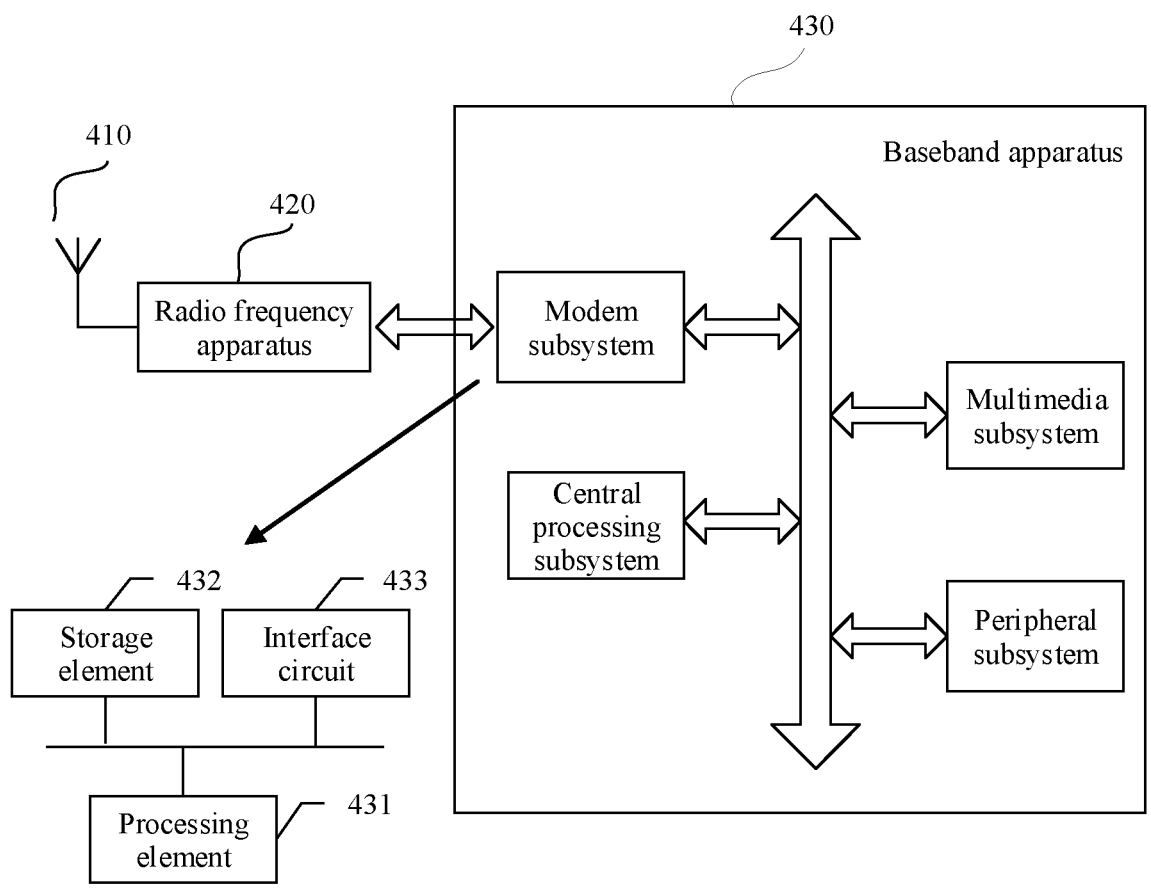
FIG. 7 is a schematic diagram of a structure of a terminal device according to an embodiment of this application.

FIG. 7 is a schematic diagram of a structure of a terminal device according to an embodiment of this application. The terminal device may be the terminal device in the foregoing embodiments, and is configured to implement the operations of the terminal device in the foregoing embodiments. As shown in FIG. 7, the terminal device includes an antenna 410, a radio frequency part 420, and a signal processing part 430. The antenna 410 is connected to the radio frequency part 420. In a downlink direction, the radio frequency part 420 receives, by using the antenna 410, information sent by a network device; and sends, to the signal processing part 430 for processing, the information sent by the network device. In an uplink direction, the signal processing part 430 processes information about the terminal device, and sends the information to the radio frequency part 420. The radio frequency part 420 processes the information about the terminal device, and then sends the processed information to the network device through the antenna 410.

The signal processing part 430 may include a modem subsystem, configured to process each communication protocol layer of data. The signal processing part 430 may further include a central processing subsystem, configured to process an operating system and an application layer of the terminal device. In addition, the signal processing part 430 may further include another subsystem, for example, a multimedia subsystem or a peripheral subsystem. The multimedia subsystem is configured to control a camera, a screen display, and the like of the terminal device. The peripheral subsystem is configured to implement a connection to another device. The modem subsystem may be an independently disposed chip. Optionally, the foregoing apparatus used for the terminal device may be located in the modem subsystem.

The modem subsystem may include one or more processing elements 431, for example, a main control CPU and another integrated circuit. In addition, the modem subsystem may further include a storage element 432 and an interface circuit 433. The storage element 432 is configured to store data and a program. However, a program used to perform the methods performed by the terminal device in the foregoing methods may not be stored in the storage element 432, but is stored in a memory outside the modem subsystem, and is loaded and used by the modem subsystem when to be used. The interface circuit 433 is configured to communicate with another subsystem. The foregoing apparatus used for the terminal device may be located in the modem subsystem, and the modem subsystem may be implemented by using a chip. The chip includes at least one processing element and an interface circuit. The processing element is configured to perform the steps of any one of the methods performed by the terminal device. The interface circuit is configured to communicate with another apparatus. In an implementation, the units in the terminal device for implementing the steps in the foregoing method may be implemented in a form of scheduling a program by the processing element. For example, the apparatus applied to the terminal device includes a processing element and a storage element. The processing element invokes a program stored in the storage element, to perform the method performed by the terminal device in the foregoing method embodiment. The storage element may be a storage element that is on the same chip as the processing unit, that is, an on-chip storage element.

In another implementation, a program used to perform the method performed by the terminal device in the foregoing method may be in a storage element that is on a different chip from the processing unit, that is, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

The units of the terminal device that implement the steps in the foregoing methods may be integrated together, and implemented in a form of a system-on-a-chip (SOC). The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by the processing element invoking a program, and functions of some units may be implemented by the integrated circuit.

The foregoing apparatus applied to the terminal device may include the at least one processing element and the interface circuit. The at least one processing element is configured to perform the method performed by the terminal device, as provided in the foregoing method embodiment. The processing element may perform some or all steps performed by the terminal device, in a first manner, by invoking the program stored in the storage element; or may perform some or all steps performed by the terminal device, in a second manner, using a hardware integrated logic circuit in the processor element in combination with an instruction; or may certainly perform, by combining the first manner and the second manner, some or all steps performed by the terminal device.

As described above, the processing element herein may be a general purpose processor, for example, a CPU, or may be one or more integrated circuits configured to implement the foregoing method, for example, one or more ASICs, one or more microprocessors DSPs, one or more FPGAs, or a combination of at least two of these forms of integrated circuits.

The storage element may be a memory, or may be a general term of a plurality of storage elements.

Figure 8:
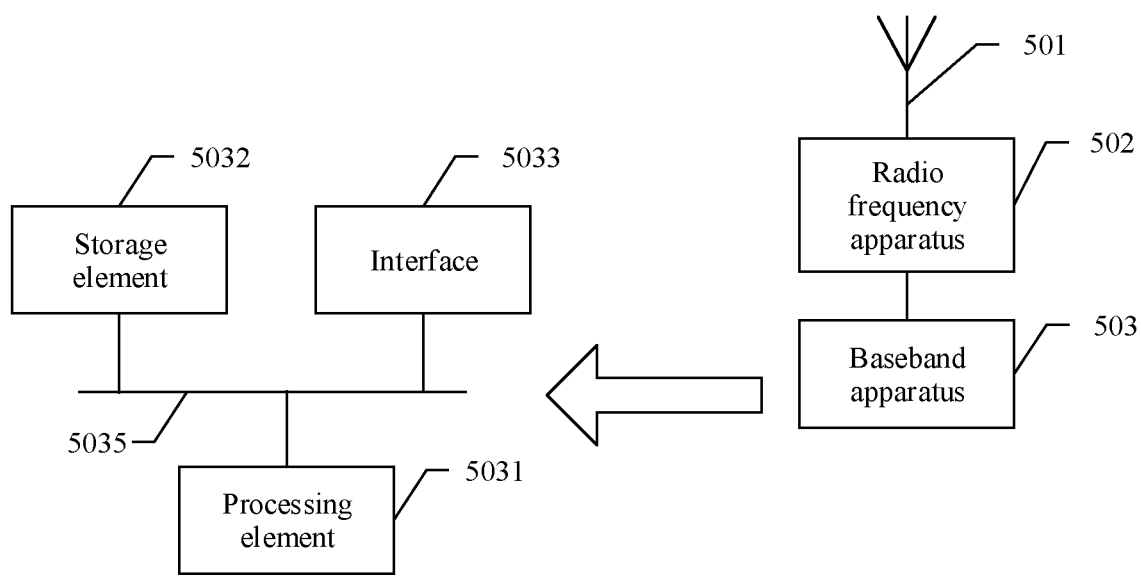
FIG. 8 is a schematic diagram of a network device according to an embodiment of this application.

FIG. 8 is a schematic diagram of a network device according to an embodiment of this application. The network device shown in FIG. 8 implements operations of the network device in the foregoing embodiments. As shown in FIG. 8, the network device includes an antenna 501, a radio frequency apparatus 502, and a baseband apparatus 503. The antenna 501 is connected to the radio frequency apparatus 502. In an uplink direction, the radio frequency apparatus 502 receives information using the antenna 501 (including information sent by a terminal device, for example), and sends, to the baseband apparatus 503 for processing, the received information. In a downlink direction, the baseband apparatus 503 processes the information about the terminal device, and sends the information to the radio frequency apparatus 502. The radio frequency apparatus 502 processes the information about the terminal device, and then sends the processed information to the terminal through the antenna 501.

The baseband apparatus 503 may include one or more processing elements 5031, for example, a main control CPU and another integrated circuit. In addition, the baseband apparatus 503 may further include a storage element 5032 and an interface 5033. The storage element 5032 is configured to store a program and data. The interface 5033 is configured to exchange information with the radio frequency apparatus 502. The interface is, for example, a common public radio interface (CPRI). The foregoing apparatus applied to the network device may be located in the baseband apparatus 503. For example, the foregoing apparatus applied to the network device may be a chip in the baseband apparatus 503. The chip includes at least one processing element and an interface circuit. The processing element is configured to perform steps in any foregoing method performed by the network device. The interface circuit is configured to communicate with another apparatus. In an implementation, the units in the network device for implementing the steps in the foregoing method may be implemented in a form of scheduling a program by the processing element. For example, the apparatus applied to the network device includes a processing element and a storage element. The processing element invokes a program stored in the storage element, to perform the method performed by the network device in the foregoing method embodiment. The storage element may be a storage element on the same chip as the processing element, that is, an on-chip storage element; or may be a storage element that is on a different chip from the processing element, that is, an off-chip storage element.

In another implementation, the units in the network device for implementing steps in the foregoing method may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing methods may be integrated together, and implemented in a form of a system-on-a-chip (SOC). For example, the baseband apparatus includes the SOC chip, configured to implement the foregoing methods. The at least one processing element and the storage element may be integrated into the chip, and the processing element invokes the program stored in the storage element to implement the foregoing method performed by the network device. Alternatively, at least one integrated circuit may be integrated into the chip, and configured to implement the foregoing method performed by the network device. Alternatively, with reference to the foregoing implementation, functions of some units are implemented in a form of a program invoked by the processing element, and functions of some units are implemented in a form of an integrated circuit.

The foregoing apparatus applied to the network device may include the at least one processing element and the interface circuit. The at least one processing element is configured to perform the method that is performed by the network device and that is provided in the foregoing method embodiment. The processing element may perform, in a first manner, that is, in a manner of executing a program stored in the storage element, some or all of the steps performed by the network device; or may perform, in a second manner, that is, in a manner of combining an integrated logical circuit of hardware in the processing element with an instruction, some or all of the steps performed by the network device; or may perform, by combining the first manner and the second manner, some or all of the steps performed by the network device.

As described above, the processing element herein may be a general purpose processor, for example, a CPU, or may be one or more integrated circuits configured to implement the foregoing method, for example, one or more ASICs, one or more microprocessors DSPs, one or more FPGAs, or a combination of at least two of these forms of integrated circuits.

The storage element may be a memory, or may be a general term of a plurality of storage elements.

An embodiment of this application further provides a processing apparatus, including a processor and an interface. The processor is configured to perform the transmission method in the foregoing method embodiments.

It should be understood that the foregoing processing apparatus may be a chip. For example, the processing apparatus may be a field programmable gate array (FPGA), an application-specific integrated circuit (ASIC), a system on chip (SoC), a central processor unit (CPU), a network processor (NP), a digital signal processor (DSP), a micro controller unit (MCU), or a programmable logic device (PLD) or another integrated chip.

In an implementation process, steps in the foregoing methods can be completed by using a hardware integrated logical circuit in the processor, or by using instructions in a form of software. The steps of the methods disclosed with reference to the embodiments of this application may be directly performed by a hardware processor, or may be performed by a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in the embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), or a direct rambus dynamic random access memory (DR RAM). It should be noted that the memory of the systems and methods described in this specification includes but is not limited to these and any memory of another proper type.

According to the methods provided in the embodiments of this application, this application further provides a computer program product, and the computer program product includes computer program code. When the computer program code is run on a computer, the computer is enabled to perform the method in the embodiment shown in FIG. 4 and described herein.

According to the method provided in the embodiments of this application, this application further provides a computer-readable medium. The computer-readable medium stores program code. When the program code is run on a computer, the computer is enabled to perform the method in any one of the embodiments shown in FIG. 4.

According to the methods provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments are corresponding to the terminal device or network device in the method embodiments. A corresponding module or unit performs a corresponding step. For example, the communication unit (the transceiver) performs sending or receiving steps in the method embodiments, and the processing unit (the processor) performs another step other than the sending and receiving steps. For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using the signal).

It should further be understood that, in this application, "when" and "if" mean that UE or a base station performs corresponding processing in an objective situation, and are not intended to limit time, and the UE or the base station is not necessarily required to have a determining action during implementation, and do not mean any other limitation.

In addition, the terms "system" and "network" in this specification may be often used interchangeably in this specification. The term "and/or" in this specification describes only an association relationship for associated objects and represents that three relationships may exist. For example, A and/or B may represent the following three cases: Only A exists, both A and B exist, and only B exists.

The term "at least one of . . . " in this specification represents all or any combination of the listed items. For example, "at least one of A, B, and C" may represent the following six cases: A exists alone, B exists alone, C exists alone, A and B coexist, B and C coexist, and A, B, and C coexist. The term "a plurality of" means two or more, and another quantifier is similar to this. In addition, an element (element) that appears in singular forms "a", "an", and "the" does not mean "one or only one" unless otherwise specified in the context, but means "one or more". For example, "a device" means one or more such devices.

It should be understood that in the embodiments of this application, "B corresponding to A" represents that B is associated with A, and B may be determined based on A. However, it should further be understood that determining B based on A does not mean that B is determined based on only A. B may alternatively be determined based on A and/or other information.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink transmission method, comprising:
    sending, by a terminal device, a first message to a network device, the first message initiating random access;
    receiving, by the terminal device, a response message in response to the sending of the first message, the response message comprising downlink control information (DCI), the DCI indicating a downlink transmission resource used for downlink data transmission; and
    performing, by the terminal device using a first preset timing advance (TA) value or a maintained TA value, uplink transmission comprising a negative acknowledgment (NACK) value if the terminal device fails to decode downlink data on the downlink transmission resource indicated by the DCI.

2. The method according to claim 1, wherein the performing the uplink transmission comprising the NACK value comprises:
    when a timing advance timer (TAT) is not running, performing, by the terminal device using the first preset TA value, the uplink transmission comprising the NACK value.

3. The method according to claim 1, wherein the performing the uplink transmission comprising the NACK value comprises:
    when a timing advance timer (TAT) is running, performing, by the terminal device using the maintained TA value, the uplink transmission comprising the NACK value.

4. The method according to claim 1, wherein the method further comprises:
    when receiving the response message, the terminal device starting or restarting a timing advance timer (TAT).

5. The method according to claim 1, wherein the method further comprises:
    receiving, by the terminal device on the downlink transmission resource, a TA command sent by the network device, the TA command indicating an absolute TA value or a relative TA value, wherein the absolute TA value is a TA value used by the terminal device for uplink transmission, and the relative TA value and the maintained TA value are used to determine the absolute TA value.

6. The method according to claim 5, wherein the method further comprises:
    if a result obtained after the terminal device decodes the downlink data is an acknowledgment (ACK), performing, by the terminal device in accordance with the TA command, uplink transmission comprising an ACK value.

7. The method according to claim 5, wherein when a timing advance timer (TAT) is running, the TA command is ignored or discarded.

8. The method according to claim 5, wherein when the terminal device receives the TA command, the method further comprises:
   starting or restarting, by the terminal device, a timing advance timer (TAT).

9. The method according to claim 5, wherein a cyclic redundancy check (CRC) of the DCI is scrambled using an identifier of the terminal device.

10. An apparatus, comprising:
   a memory storing instructions; and
   at least one processor coupled to the memory, the at least one processor executing the instructions to perform operations comprising:
      sending a first message to a network device, wherein the first message is used to initiate random access;
      receiving a response message in response to the sending of the first message, the response message comprising downlink control information (DCI), the DCI indicating a downlink transmission resource for downlink data transmission; and
      performing, using a first preset timing advance (TA) value or a maintained TA value, uplink transmission comprising a negative acknowledgment (NACK) value if the terminal device fails to decode the downlink data on the downlink transmission resource indicated by the DCI.

11. The apparatus according to claim 10, wherein the operation of performing the uplink transmission comprising the NACK value comprises:
   when a timing advance timer (TAT) is not running, performing uplink transmission using the first preset TA value.

12. The apparatus according to claim 10, wherein the operation of performing the uplink transmission comprising the NACK value comprises:
   when a timing advance timer (TAT) is running, performing uplink transmission comprising the NACK value using the maintained TA value.

13. The apparatus according to claim 10, wherein the operation further comprises:
   when receiving the response message, starting or restarting a timing advance timer (TAT).

14. The apparatus according to claim 10, wherein the operations further comprise:
   receiving on the downlink transmission resource, a TA command sent by the network device, the TA command indicating an absolute TA value or a relative TA value, wherein the absolute TA value is a TA value used by the terminal device for uplink transmission, and the relative TA value and the maintained TA value are used to determine the absolute TA value.

15. The apparatus according to claim 14, wherein the operations further comprise:
   if a result obtained after the terminal device decodes the downlink data is an acknowledgment (ACK), performing uplink transmission comprising an ACK value in accordance with the TA command.

16. The apparatus according to claim 14, wherein when a timing advance timer (TAT) is running, the TA command is ignored or discarded.

17. The apparatus according to claim 14, wherein
   the operations further comprise: starting or restarting a timing advance timer (TAT).

18. The apparatus according to claim 10, wherein a cyclic redundancy check (CRC) of the DCI is scrambled using an identifier of the apparatus.

19. A non-transitory computer storage medium storing instructions executable by a processor, the instructions comprising instructions for:
   sending a first message to a network device, wherein the first message is used to initiate random access;
   receiving a response message in response to the sending of the first message, the response message comprising downlink control information (DCI), the DCI indicating a downlink transmission resource for downlink data transmission; and
   performing, using a first preset timing advance (TA) value or a maintained TA value, uplink transmission comprising a negative acknowledgment (NACK) value if the terminal device fails to decode the downlink data on the downlink transmission resource indicated by the DCI.

20. The non-transitory computer storage medium of claim 19, wherein the instructions further comprise instructions for:
   receiving a TA command on the downlink transmission resource; and
   if a result obtained after the terminal device decodes the downlink data is an acknowledgment (ACK), performing uplink transmission comprising an ACK value in accordance with the TA command.

\* \* \* \* \*